US010965236B2

(12) United States Patent
Zhao et al.

(10) Patent No.: US 10,965,236 B2
(45) Date of Patent: Mar. 30, 2021

(54) MOTOR CONTROL SYSTEM AND ASSOCIATED METHOD TO CONTROL MOTOR SPEED

(71) Applicant: Chengdu Monolithic Power Systems Co., Ltd., Chengdu (CN)

(72) Inventors: Qiming Zhao, Hangzhou (CN); Long Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/543,290

(22) Filed: Aug. 16, 2019

(65) Prior Publication Data
US 2020/0067440 A1    Feb. 27, 2020

(30) Foreign Application Priority Data
Aug. 21, 2018  (CN) .......................... 201810951138.8

(51) Int. Cl.
*H02P 23/00* (2016.01)
*H02P 7/29* (2016.01)

(52) U.S. Cl.
CPC ........ *H02P 23/0027* (2013.01); *H02P 7/2913* (2013.01)

(58) Field of Classification Search
CPC .................... H02P 23/0027; H02P 7/2913
See application file for complete search history.

(56) References Cited

U.S. PATENT DOCUMENTS

| 5,313,548 A * | 5/1994 | Arvidson ................. A62C 5/02 388/800 |
| 6,366,070 B1 * | 4/2002 | Cooke ................. H02M 3/1588 323/284 |
| 7,305,316 B2 * | 12/2007 | Frankel .............. H05K 7/20209 318/471 |
| 7,375,486 B2 * | 5/2008 | Ku .......................... G06F 1/206 318/471 |
| 7,605,556 B2 * | 10/2009 | Frankel .............. H05K 7/20209 318/400.07 |
| 8,436,562 B2 * | 5/2013 | Fan Chiang ............ H02P 6/005 318/400.29 |
| 8,669,725 B2 * | 3/2014 | Wu .......................... G06F 1/206 318/268 |
| 9,541,973 B2 | 1/2017 | Eric |
| 9,684,745 B2 | 6/2017 | Eric |
| 2018/0356848 A1 | 12/2018 | Wangmiao |
| 2019/0129868 A1 | 5/2019 | Lijie |

* cited by examiner

*Primary Examiner* — Rina I Duda
(74) *Attorney, Agent, or Firm* — Perkins Coie LLP (57) ABSTRACT

A motor control system has a computing device and a motor controller. The computing device receives user demands through a GUI, and provides a preset speed table based on the user demands. The preset speed table has a plurality of fixed values of a duty cycle of a pulse width modulation signal and a plurality of preset values of a preset motor speed corresponding to the plurality of fixed values of the duty cycle of the pulse width modulation signal. The motor controller provides the pulse width modulation signal to drive a motor based on the preset speed table.

15 Claims, 8 Drawing Sheets

MOTOR CONTROL SYSTEM AND ASSOCIATED METHOD TO CONTROL MOTOR SPEED

CROSS-REFERENCE TO RELATED APPLICATION

This application claims the benefit of CN application No. 201810951138.8, filed on Aug. 21, 2018, and incorporated herein by reference.

TECHNICAL FIELD

The present invention generally relates to electronic circuits, and more particularly, relates to motor control system and method for controlling a motor speed.

BACKGROUND

Nowadays, direct current (DC) motor is widely used in many applications. The most popular control technology for controlling DC motor speed is pulse width modulation technique. Generally speaking, a pulse width modulation signal is employed to drive a motor, and a motor speed is controlled via controlling a duty cycle of the pulse width modulation signal. And traditional DC motor control circuit is usually employed to control the motor speed constant at a corresponding preset duty cycle of the pulse width modulation signal. However, the motor speed at the corresponding preset duty cycle needs adapting for different applications.

SUMMARY

It is one of the objects of the present invention to provide motor control system and associated control method for controlling a motor.

One embodiment of the present invention discloses a control method for controlling a motor, comprising receiving user demands through a graphical user interface; providing a preset speed table based on the user demands, the preset speed table comprises a plurality of fixed values of a duty cycle of a pulse width modulation signal and a plurality of preset values of a preset motor speed corresponding to the plurality of fixed values of the duty cycle of the pulse width modulation signal; providing the pulse width modulation signal based on the preset speed table for driving the motor, and reading an actual motor speed at a plurality of different values of the duty cycle of the pulse width modulation signal; displaying the actual motor speed and the preset motor speed simultaneously through the graphical user interface; and download the preset speed table to a motor controller.

Another embodiment of the present invention discloses a motor control system, comprising: a computing device, comprising a memory, a processor, a graphical user interface, and an input and output interface, the processor is configured to execute a readable programming code stored in the memory, the computing device is configured to receive user demands through the graphical user interface, and the computing device is configured to provide a preset speed table based on the user demands, the preset speed table comprises a plurality of fixed values of a duty cycle of a pulse width modulation signal and a plurality of preset values of a preset motor speed corresponding to the plurality of fixed values of the duty cycle of the pulse width modulation signal; and a motor controller, coupled to the computing device via the input and output interface, the motor controller is configured to provide the pulse width modulation signal to drive a motor based on the preset speed table.

Yet another embodiment of the present invention discloses a control method for controlling a motor, comprising: receiving user demands through a graphical user interface, wherein the user demands comprise a minimum value of a duty cycle of a pulse width modulation signal and a first value of a customized motor speed corresponding to the minimum value of the duty cycle of the pulse width modulation signal, a maximum value of the duty cycle of the pulse width modulation signal and a second value of the customized motor speed corresponding to the maximum value of the duty cycle of the pulse width modulation signal, and an intermediate value of the duty cycle of the pulse width modulation signal and a third value of the customized motor speed corresponding to the intermediate value of the duty cycle of the pulse width modulation signal, the intermediate value is larger than the minimum value, and is smaller than the maximum value; providing a preset speed table based on the user demands, wherein the preset speed table comprises the duty cycle of the pulse width modulation signal and a preset motor speed corresponding to the duty cycle of the pulse width modulation signal; providing the pulse width modulation signal based on the preset speed table for driving the motor; and reading back an actual motor speed when the motor is rotating.

Embodiments of the present invention, providing a motor control system and associated method to flexibly configure a motor speed based on user demands, which greatly reduce cost and design cycle.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
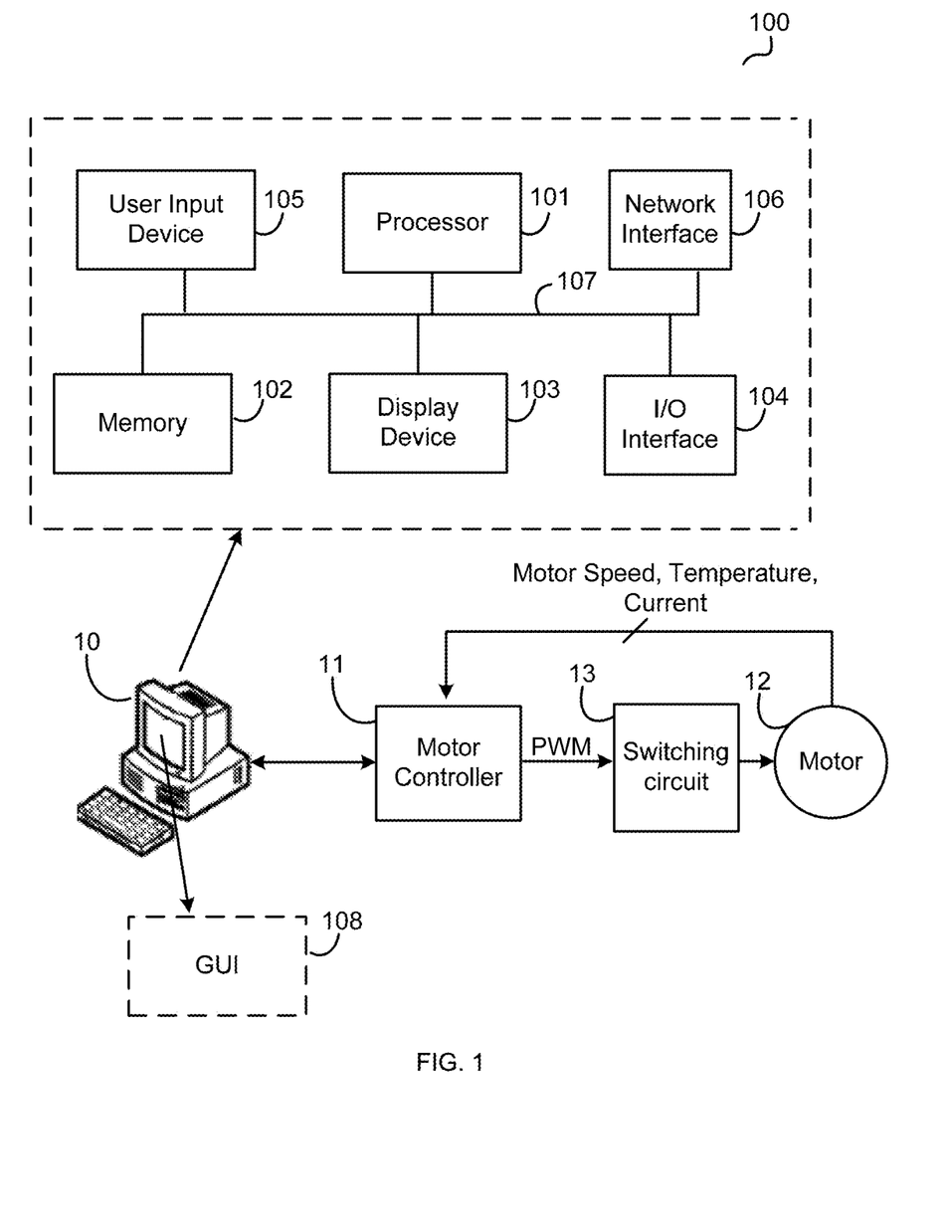
FIG. 1 illustrates a block diagram of a motor control system 100 in accordance with an embodiment of the present invention.

FIG. 1 illustrates a block diagram of a motor control system 100 in accordance with an embodiment of the present invention. Motor control system 100 comprises a computing device 10, a motor controller 11, a motor 12 and a switching circuit 13. Computing device 10 is a computer as an example. In one embodiment, computing device 10 comprises a processor 101, a memory 102, a display device 103, an input/output (I/O) interface 104, a user input device 105 (e.g., keyboard, mouse), a network interface 106, and one or more buses 107 coupling a plurality of devices of computing device 10. Buses 107 are used for communication between the plurality of devices of computing device 10.

In one embodiment, a graphical user interface (GUI) 108 is displayed on display device 103, and user demands on motor speed are received through GUI 108. Processor 101 executes a readable programming code stored in memory 102, and provides a preset speed table based on the user demands.

In one embodiment, I/O interface 104 comprises a universal serial bus (USB) interface. Motor controller 11 is coupled to computing device 10 through I/O interface 104. Motor controller 11 is configured to provide a pulse width modulation signal PWM to control motor 12 based on the preset speed table. Motor controller 11 is configured to regulate a duty cycle of pulse width modulation signal PWM to control switching circuit 13, and thus to control a speed of motor 12. In one embodiment, the preset speed table comprises a duty cycle of pulse width modulation signal PWM and a preset motor speed corresponding to the duty cycle of pulse width modulation signal PWM. In one embodiment, computing device 10 downloads the preset speed table to motor controller 11 through I/O interface 104.

In one embodiment, motor controller 11 further receives operating parameters during rotating of motor 12, operating parameters are e.g., an actual motor speed, a temperature, and a current. Computing device 10 automatically reads the operating parameters and displays them through GUI 108, or performs some calculations based on the readable programming code stored in memory 102.

Figure 2:
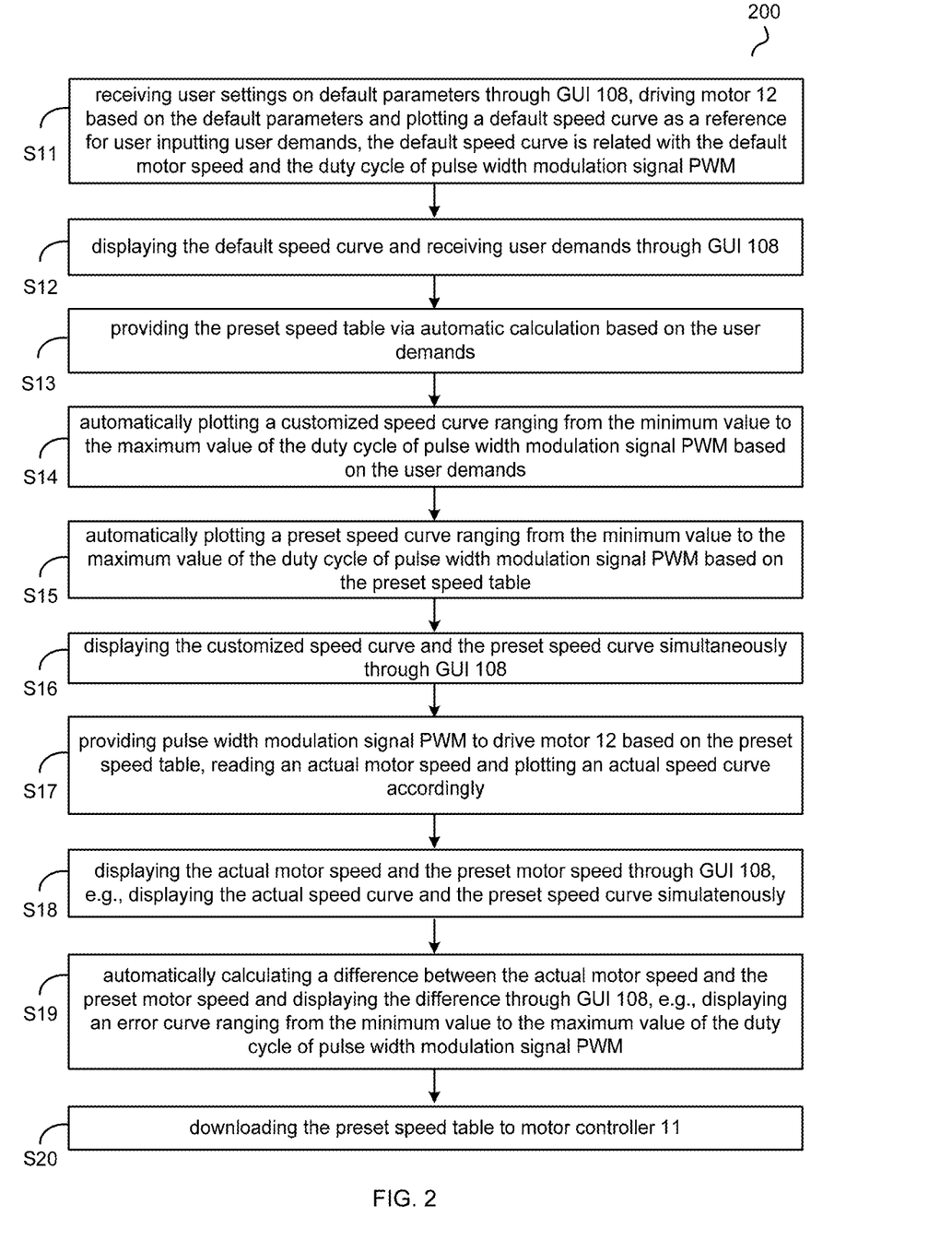
FIG. 2 illustrates a flow chart 200 regarding a motor speed control method in accordance with an embodiment of the present invention.

FIG. 2 illustrates a flow chart 200 regarding a motor speed control method in accordance with an embodiment of the present invention. Flow chart 200 comprises steps S11-S20.

Step S11 comprises receiving user settings on default parameters through GUI 108, e.g., default parameters of motor 12 and motor controller 11, comprising a number of magnet poles, rotor lock instructions, a current limit value, a phase difference between counter electromotive force and Hall, and a soft turn-on angle, driving motor 12 based on the default parameters, and plotting a default speed curve as a reference for user inputting the user demands. Motor 12 has a default motor speed when motor 12 rotates under the default parameters, and the default speed curve is related with the default motor speed and the duty cycle of pulse width modulation signal PWM.

Step S12 comprises displaying the default speed curve and receiving the user demands through GUI 108. In one embodiment, the user demands comprise a minimum value of the duty cycle of pulse width modulation signal PWM and a first value of a customized motor speed corresponding to the minimum value of the duty cycle of pulse width modulation signal PWM, a maximum value of the duty cycle of pulse width modulation signal PWM and a second value of the customized motor speed corresponding to the maximum value of the duty cycle of pulse width modulation signal PWM, an intermediate value of the duty cycle of pulse width modulation signal PWM and a third value of the customized motor speed corresponding to the intermediate value of the duty cycle of pulse width modulation signal PWM. The intermediate value is larger than the minimum value, and is less than the maximum value.

Step S13 comprises providing the preset speed table via automatic calculation based on the user demands.

Step S14 comprises automatically plotting a customized speed curve ranging from the minimum value to the maximum value of the duty cycle of pulse width modulation signal PWM based on the user demands. The customized speed curve is related with the customized motor speed and the duty cycle of pulse width modulation signal PWM.

Step S15 comprises automatically plotting a preset speed curve ranging from the minimum value to the maximum value of the duty cycle of pulse width modulation signal PWM based on the preset speed table. The preset speed curve is related with the preset motor speed and the duty cycle of pulse width modulation signal PWM.

Step S16 comprises displaying the customized speed curve and the preset speed curve simultaneously through GUI 108.

Step S17 comprises providing pulse width modulation signal PWM to drive motor 12 based on the preset speed table, reading an actual motor speed and plotting an actual speed curve accordingly. The actual speed curve is related with the actual motor speed and the duty cycle of pulse width modulation signal PWM.

Step S18 comprises displaying the actual motor speed and the preset motor speed through GUI 108, e.g., displaying the actual speed curve and the preset speed curve simultaneously.

Step S19 comprises automatically calculating a difference between the actual motor speed and the preset motor speed and displaying the difference through GUI 108, e.g., displaying an error curve ranging from the minimum value to the maximum value of the duty cycle of pulse width modulation signal PWM. The error curve is related with the duty cycle of pulse width modulation signal PWM and the difference between the actual motor speed and the preset motor speed.

Step S20 comprises downloading the preset speed table to motor controller 11.

It should be noted that in the flow chart 200 described above, the box functions may also be implemented with different order as shown in FIG. 2. Two successive box functions may be executed meanwhile, or sometimes the box functions may be executed in a reverse order. For example, step S14 may be executed before step S13.

Aforementioned method providing the preset speed table can set the motor speed flexibly based on the user demands, customization is easy to achieve with lower cost, less design and debugging period. Furthermore, online verification is realized to facilitate the user to optimize the motor speed.

Figure 3:
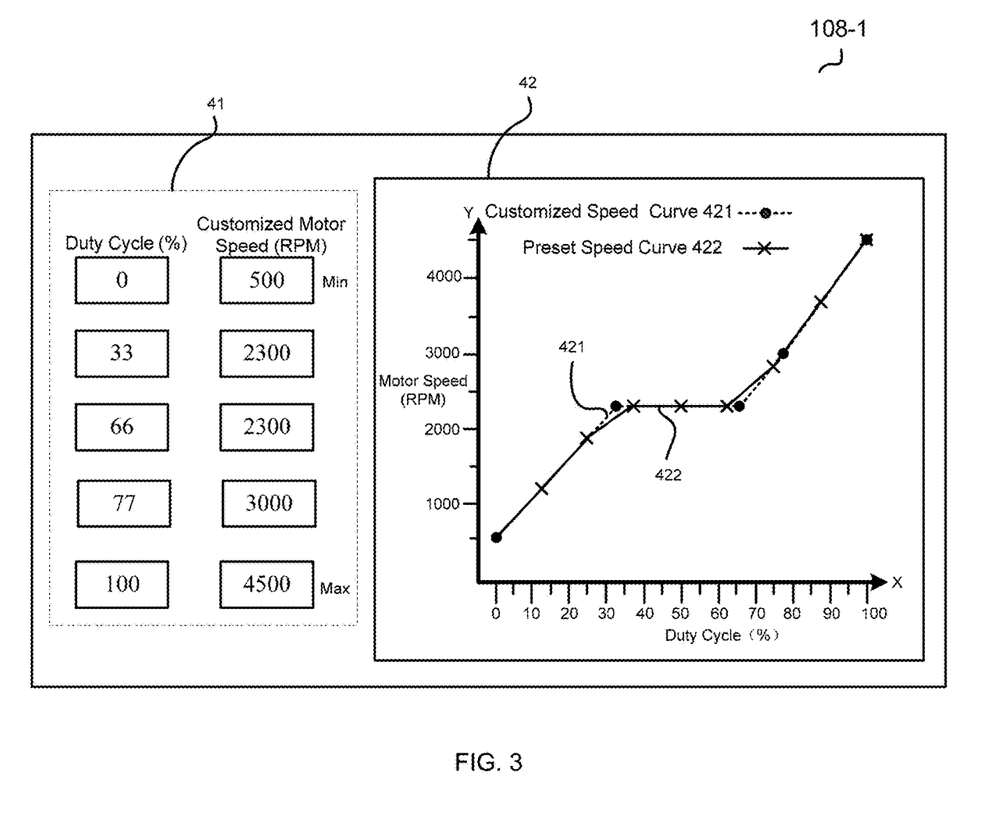
FIG. 3 illustrates a graphical user interface 108-1 in accordance with embodiments of the present invention.

FIG. 3 illustrates a graphical user interface 108-1 in accordance with embodiments of the present invention. In the embodiment shown in FIG. 3, graphical user interface 108-1 receives the user demands in region 41, e.g., a minimum value of the duty cycle of pulse width modulation signal PWM is 0% and the customized motor speed is 500 RPM (resolution per minute) corresponding to the minimum value of the duty cycle of pulse width modulation signal PWM, a maximum value of the duty cycle of pulse width modulation signal PWM is 100% and the customized motor speed is 4500 RPM corresponding to the maximum value of the duty cycle of pulse width modulation signal PWM, a first intermediate value of the duty cycle of pulse width modulation signal PWM is 33% and the customized motor speed is 2300 RPM corresponding to the first intermediate value of the duty cycle of pulse width modulation signal PWM, a second intermediate value of the duty cycle is 66% and the customized motor speed is 2300 RPM corresponding to the second intermediate value of the duty cycle of pulse width modulation signal PWM, a third intermediate value of the duty cycle of pulse width modulation signal PWM is 77% and the customized motor speed is 3000 RPM corresponding to the third intermediate value of the duty cycle of pulse width modulation signal PWM. A person of ordinary skill in the art should understand that the user demands are not limited as FIG. 3 shown. In one embodiment, user may input at least one intermediate value of the duty cycle of pulse width modulation signal PWM and corresponding customized motor speed. In one embodiment, user may input a plurality of intermediate values of the duty cycle of pulse width modulation signal PWM and corresponding a plurality of values of customized motor speed. In one embodiment, when pulse width modulation signal PWM is at the minimum value of the duty cycle, corresponding customized motor speed is a minimum speed, and when pulse width modulation signal is at the maximum value of the duty cycle, corresponding customized motor speed is a maximum speed.

Graphical user interface 108-1 further compares the user demands and preset motor speed in region 42. As shown in FIG. 3, a customized speed curve 421 is automatically plotted through graphical user interface 108-1 ranging from the minimum value to the maximum value of the duty cycle (e.g., 0%-100%) of pulse width modulation signal PWM as shown by a dotted line in region 42 based on the user demands received in region 41. A horizontal axis X represents the duty cycle of pulse width modulation signal PWM, a vertical axis Y represents the motor speed. Customized speed curve 421 is related with the customized motor speed and the duty cycle of pulse width modulation signal PWM. Coordinates marked by black dots represent the customized motor speed and corresponding duty cycle of pulse width modulation signal PWM inputted by user. In the embodiment shown in FIG. 3, customized speed curve 421 is generated by connecting each of the coordinates marked by black dots through a plurality of straight lines. In another embodiment, customized speed curve 421 is generated by connecting each of the coordinates marked by black dots through a plurality of smooth splines. Computing device 10 automatically calculates the preset speed table based on the user demands, the preset speed table comprises the duty cycle of pulse width modulation signal PWM and the preset motor speed corresponding to the duty cycle of pulse width modulation signal PWM, the preset motor speed in the preset speed table comprises a plurality of preset values and the duty cycle of pulse width modulation signal PWM in the preset speed table comprises a plurality of fixed values.

Figure 4:
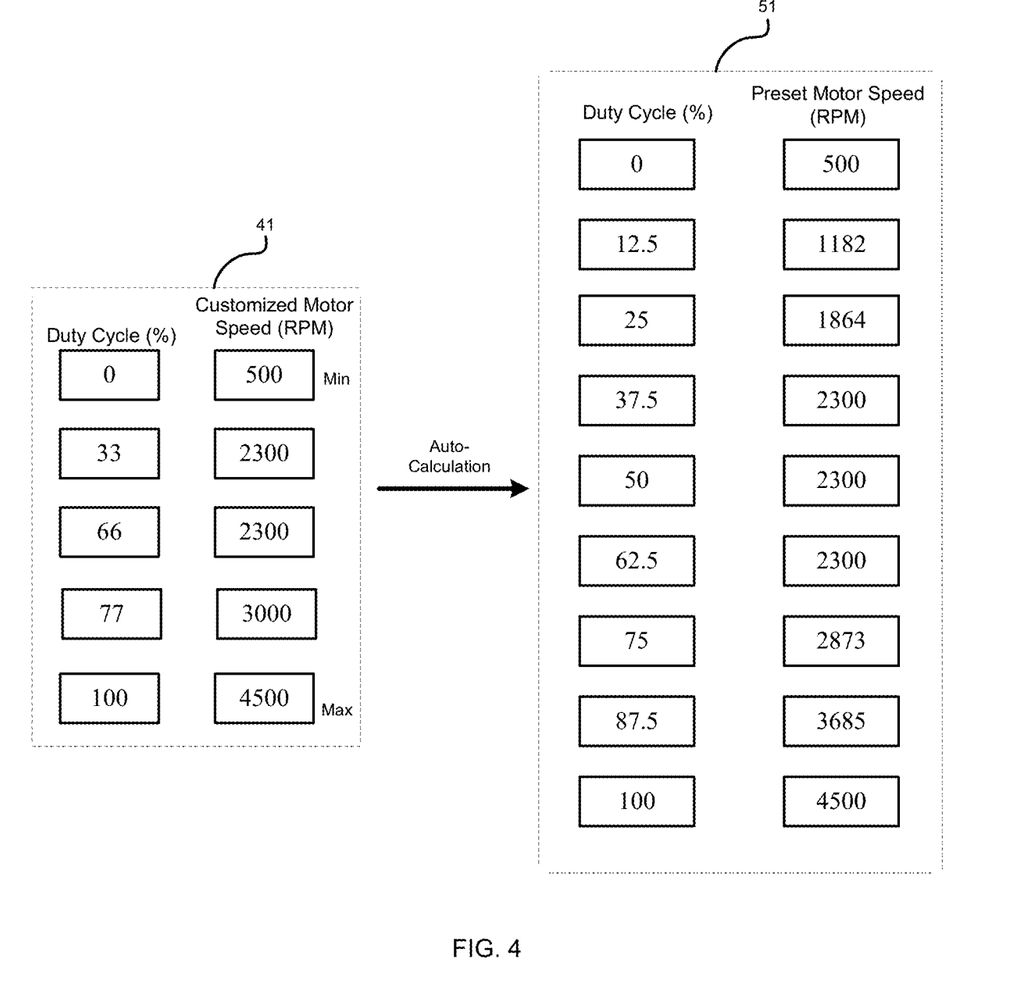
FIG. 4 illustrates a preset speed table 51 in accordance with an embodiment of the present invention.

In one embodiment, the plurality of fixed values are uniformly distributed in the range of the minimum value and the maximum value, e.g., the difference between each of the plurality of fixed values of the duty cycle is the same. As shown in FIG. 4, a preset speed table 51 is provided via auto-calculation based on the user demands received in region 41. In the example of FIG. 4, the plurality of fixed values of the duty cycle of pulse width modulation signal PWM in preset speed table 51 are 0%, 12.5%, 25%, 37.5%, 50%, 62.5%, 75%, 87.5%, and 100%, and corresponding the plurality of preset values of the preset motor speed respectively are 500, 1182, 1864, 2300, 2300, 2300, 2873, 3685, and 4500 RPM.

Graphical user interface 108-1 automatically plots a preset speed curve 422 ranging from the minimum value to the maximum value (e.g., 0%-100%) of the duty cycle of pulse width modulation signal PWM as shown in FIG. 3 based on preset speed table 51. Coordinates marked by two crossed lines represent the plurality of preset values of the preset motor speed at corresponding the plurality of fixed values of the duty cycle of pulse width modulation signal PWM. Preset speed curve 422 is related with the preset motor speed and the duty cycle of pulse width modulation signal PWM. In one embodiment, preset speed curve 422 is generated by connecting each of the coordinates marked by two crossed lines through a plurality of straight lines or smooth splines. One with ordinary skill in the art should understand that the fixed values of the duty cycle of pulse width modulation signal PWM are not limited as FIG. 3 and FIG. 4 shown. In another embodiment, the fixed values of the duty cycle of pulse width modulation signal PWM may comprise 0%, 10%, 20%, 30%, 40%, 50%, 60%, 70%, 80%, 90%, 100% as one example.

In one embodiment, receiving the user demands through graphical user interface 108-1 is not limited by the embodiment shown in FIG. 3. For example, user may set or adjust the customized motor speed and corresponding duty cycle of pulse width modulation signal PWM by dragging coordinates on customized speed curve 421.

In one embodiment, processor 101 executes the readable programming code in memory 102 and provides preset speed table 51 via auto-calculation, e.g., according to the user demands, the preset motor speed at the plurality of fixed values of the duty cycle of pulse width modulation signal PWM are calculated one by one to make preset speed curve 422 being closest to customized speed curve 421. Taking the embodiment shown in FIG. 4 as an example, according to the customized motor speed at 0% duty cycle of pulse width modulation signal PWM, the preset motor speed at 0% duty cycle of pulse width modulation signal PWM is generated; according to the customized motor speed (500 RPM) at 0% duty cycle and the customized motor speed (2300 RPM) at 33% duty cycle, the preset motor speed at 12.5% duty cycle and the preset motor speed at 25% duty cycle are calculated; according to the customized motor speed (2300 RPM) at 33% duty cycle and the customized motor speed (2300 RPM) at 66% duty cycle, the preset motor speed respective at 37.5%, 50% and 62.5% duty cycle are calculated; according to the customized motor speed (2300 RPM) at 66% duty cycle and the customized motor speed (3000 RPM) at 77% duty cycle, the preset motor speed at 75% duty cycle is calculated; according to the customized motor speed (3000 RPM) at 77% duty cycle and the customized motor speed (4500 RPM) at 100% duty cycle, the preset motor speed at 87.5% duty cycle is calculated; and according to the motor speed (4500 RPM) at 100% duty cycle, the preset motor speed at 100% duty cycle is generated.

In one embodiment, the calculation of the preset motor speed can be carried out referring following formulas (1) and (2), that is (the customized motor speed at a first duty cycle–the customized motor speed at a second duty cycle)/(the first duty cycle–the second duty cycle)=(the preset motor speed at a first fixed duty cycle—the customized motor speed at the second duty cycle)/(the first fixed duty cycle—the second duty cycle). In the following formulas (1), X presents the preset motor speed at 12.5% duty cycle of pulse width modulation signal PWM, and in the following formulas (2), Y presents the preset motor speed at 75% duty cycle of pulse width modulation signal PWM. Calculation of the preset motor speed at other fixed values of the duty cycle are similar.

$$(2300-500)/(33-0)=(X-500)/(12.5-0) \quad (1)$$

$$(3300-2300)/(77-66)=(Y-2300)/(75-66) \quad (2)$$

In another embodiment, the preset motor speed is equal to the customized motor speed at corresponding duty cycle of pulse width modulation signal PWM on customized speed curve 421.

Figure 5:
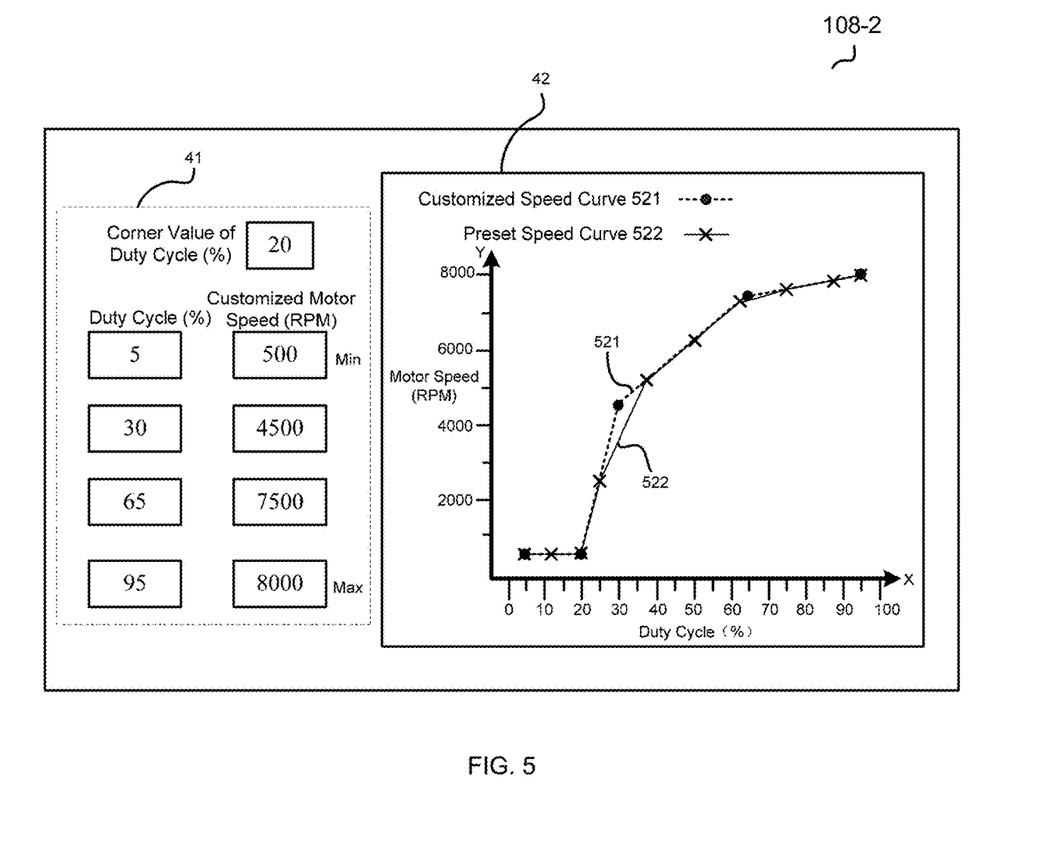
FIG. 5 illustrates a graphical user interface 108-2 in accordance with embodiments of the present invention.

FIG. 5 illustrates a graphical user interface 108-2 in accordance with embodiments of the present invention. In the embodiment shown in FIG. 5, graphical user interface 108-2 receives the user demands in region 41, e.g., the minimum value of the duty cycle of pulse width modulation signal PWM is 5%, and corresponding customized motor speed is 500 RPM, the maximum value of the duty cycle of pulse width modulation signal PWM is 95%, and corresponding customized motor speed is 8000 RPM, the customized motor speed is 4500 RPM when the duty cycle is 30%, and the customized motor speed is 7500 RPM when the duty cycle is 65%. In the embodiment shown in FIG. 5, the user demands further comprise: a corner value of the duty cycle of pulse width modulation signal PWM, e.g., 20%, the customized motor speed maintains the same when the duty cycle of pulse width modulation signal PWM is less the corner value. Similar to graphical user interface 108-1 shown in FIG. 3, the preset motor speed is compared with the user demands in region 42 of graphical user interface 108-2. A customized speed curve 521 is plotted through graphical user interface 108-2 ranging from the minimum value to the maximum value of the duty cycle (e.g., 5%-95% as shown in FIG. 5) of pulse width modulation signal PWM based on the user demands, a preset speed curve 522 is plotted ranging from the minimum value to the maximum value of the duty cycle (e.g., 5%-95% as shown in FIG. 5) of pulse width modulation signal PWM based on a preset speed table 52 shown in FIG. 6, and customized speed curve 521 and preset speed curve 522 are displayed in region 42 simultaneously. One of ordinary skill in the art should know that the minimum value and the maximum value of the duty cycle of pulse width modulation signal PWM are not restricted by embodiments shown in FIG. 3 and FIG. 5.

Figure 6:
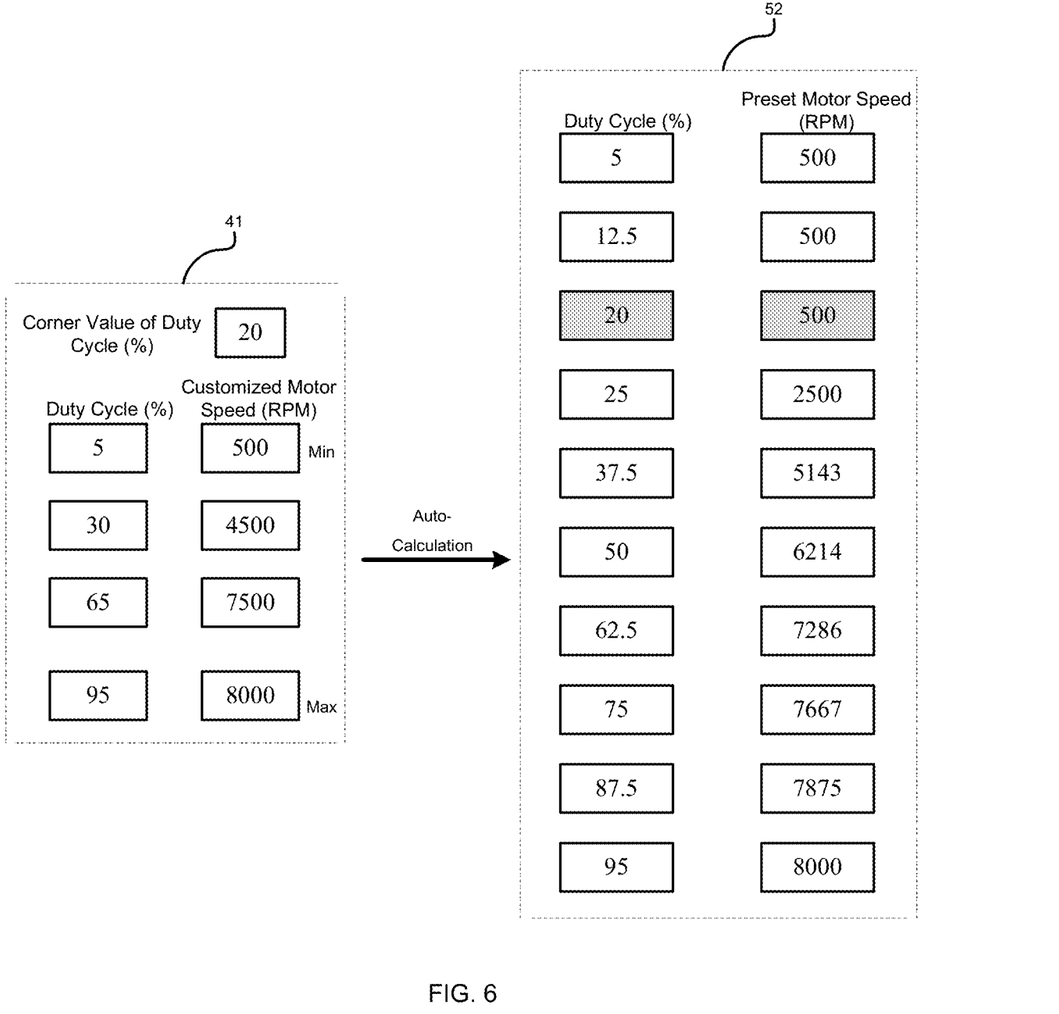
FIG. 6 illustrates a preset speed table 52 in accordance with an embodiment of the present invention.

FIG. 6 illustrates preset speed table 52 in accordance with an embodiment of the present invention. Preset speed table 52 is provided via auto-calculation based on the user demands received in region 41. In the embodiment shown in FIG. 6, the plurality of fixed values of the duty cycle of pulse width modulation signal PWM in preset speed table 52 are 5%, 12.5%, 25%, 37.5%, 50%, 62.5%, 75%, 87.5%, and 95%, and corresponding the plurality of preset values of the preset motor speed respectively are 500, 500, 2500, 5143, 6214, 7286, 7667, 7875, and 800 RPM. The duty cycle of pulse width modulation signal PWM in preset speed table 52 further comprises the corner value (e.g., 20%), and the preset motor speed in preset speed table 52 further comprises a value (e.g., 500) corresponding to the corner value of the duty cycle of pulse width modulation signal PWM. The preset motor speed maintains the same when the duty cycle of pulse width modulation signal PWM is less than the corner value.

Figure 7:
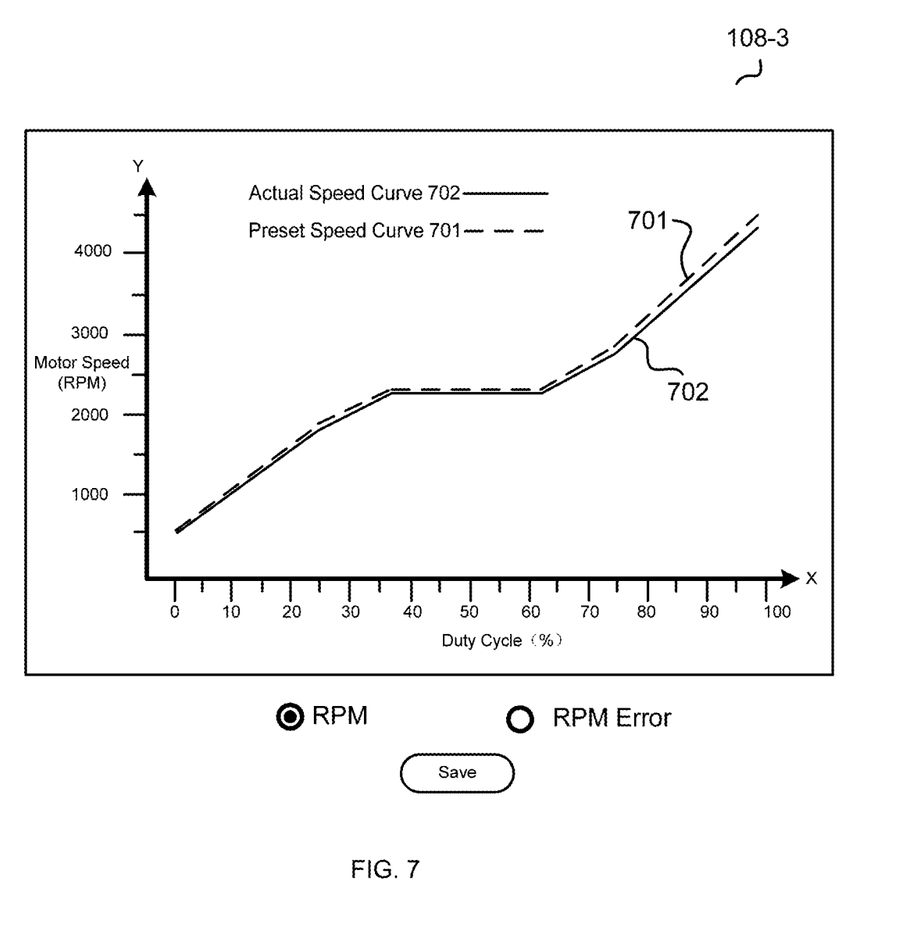
FIG. 7 illustrates a graphical user interface 108-3 in accordance with embodiments of the present invention.

FIG. 7 illustrates a graphical user interface 108-3 in accordance with embodiments of the present invention. In one embodiment, computing device 10 reads an actual motor speed at a plurality of different values of the duty cycle of pulse width modulation signal PWM, and the actual motor speed are compared with the preset motor speed. In the embodiment shown in FIG. 7, an actual speed curve 702 is plotted based on the actual motor speed read back by computing device 10, and actual speed curve 702 and a preset speed curve 701 are displayed through graphical user interface 108-3 simultaneous. The horizontal axis X represents the duty cycle of pulse width modulation signal PWM, and the vertical axis Y represents the motor speed. Actual speed curve 702 is related with the actual motor speed and the duty cycle of pulse width modulation signal PWM. Preset speed curve 701 is related with the preset motor speed and the duty cycle of pulse width modulation signal PWM.

Figure 8:
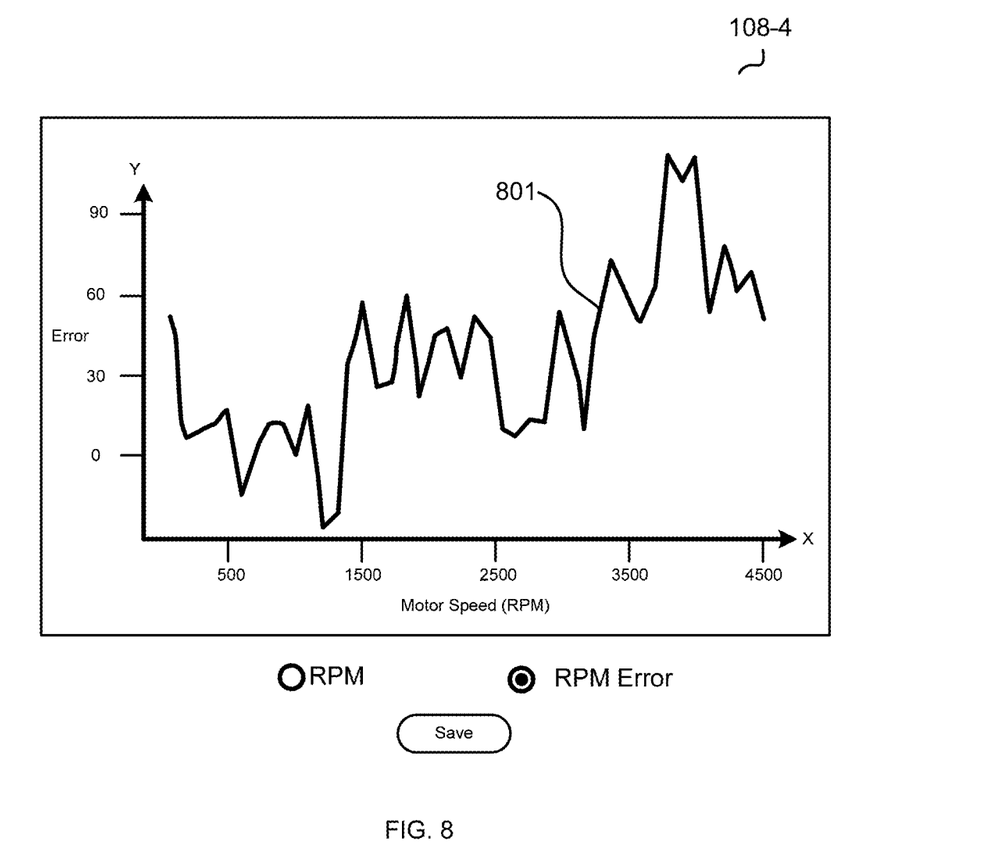
FIG. 8 illustrates a graphical user interface 108-4 in accordance with embodiments of the present invention.

FIG. 8 illustrates a graphical user interface 108-4 in accordance with embodiments of the present invention. In one embodiment, computing device 10 reads the actual motor speed at the plurality of different values of the duty cycle of pulse width modulation signal PWM, calculates a difference between the actual motor speed and the preset motor speed, and displays the difference through graphical user interface 108-4, e.g., plotting an error curve 801, error curve 801 is related with the duty cycle of pulse width modulation signal and the difference between the actual motor speed and the preset motor speed. In FIG. 8, the horizontal axis X represents the duty cycle of pulse width modulation signal PWM, and the vertical axis Y represents an error signal, that is the difference between the actual motor speed and the preset motor speed.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method for controlling a motor, comprising:
receiving user demands through a graphical user interface;
providing a preset speed table based on the user demands, the preset speed table comprises a plurality of fixed values of a duty cycle of a pulse width modulation signal and a plurality of preset values of a preset motor speed corresponding to the plurality of fixed values of the duty cycle of the pulse width modulation signal, and the preset motor speed table is provided via auto-calculation based on the user demands, the preset motor speed at one of the plurality of fixed values of the duty cycle of the pulse width modulation signal is calculated according to a difference between a customized motor speed at a first value of the duty cycle and a second value of the duty cycle and a difference between the first value and the second value of the duty cycle, the first value of the duty cycle is less than the one of the plurality of fixed values of the duty cycle, and the second value of the duty cycle is larger than the one of the plurality of fixed values of the duty cycle; and providing the pulse width modulation signal based on the preset speed table for driving the motor.

2. The control method of claim 1, further comprising:
receiving user settings on default parameters of the motor through the graphical user interface;
driving the motor based on the default parameters, wherein the motor has a default motor speed when the motor rotates under the default parameters; and
plotting a default speed curve as a reference for inputting the user demands, wherein the default speed curve is related with the default motor speed and the duty cycle of the pulse width modulation signal.

3. The control method of claim 1, wherein the user demands comprise:
a minimum value of the duty cycle of the pulse width modulation signal and a first value of the customized motor speed corresponding to the minimum value of the duty cycle of the pulse width modulation signal;
a maximum value of the duty cycle of the pulse width modulation signal and a second value of the customized motor speed corresponding to the maximum value of the duty cycle of the pulse width modulation signal; and
an intermediate value of the duty cycle of the pulse width modulation signal and a third value of the customized motor speed corresponding to the intermediate value of the duty cycle of the pulse width modulation signal, wherein the intermediate value is larger than the minimum value, and is smaller than the maximum value; wherein
the first value of the duty cycle comprises the minimum value or the intermediate value, and the second value of the duty cycle comprises the intermediate value or the maximum value.

4. The control method of claim 1, wherein the user demands comprise:
a minimum value of the duty cycle of the pulse width modulation signal and a first value of the customized motor speed corresponding to the minimum value of the duty cycle of the pulse width modulation signal;
a maximum value of the duty cycle of the pulse width modulation signal and a second value of the customized motor speed corresponding to the maximum value of the duty cycle of the pulse width modulation signal; and
a corner value of the duty cycle of the pulse width modulation signal, wherein the customized motor speed equals the first value when the duty cycle of the pulse width modulation signal equals or is less than the corner value.

5. The control method of claim 1, further comprising:
calculating a difference between the preset motor speed and an actual motor speed, and displaying the difference through the graphical user interface.

6. The control method of claim 1, wherein the user demands further comprise:
a corner value of the duty cycle of the pulse width modulation signal, the corner value is between a minimum value and an intermediate value of the duty cycle of the pulse width modulation signal; and wherein the preset motor speed maintains a first value when the duty cycle of the pulse width modulation signal equals or is less than the corner value.

7. A motor control system, comprising:
a computing device, comprising a memory, a processor, a graphical user interface, and an input and output interface, the processor is configured to execute a readable programming code stored in the memory, the computing device is configured to receive user demands through the graphical user interface, and the computing device is configured to provide a preset speed table based on the user demands, the preset speed table comprises a plurality of fixed values of a duty cycle of a pulse width modulation signal and a plurality of preset values of a preset motor speed corresponding to the plurality of fixed values of the duty cycle of the pulse width modulation signal, and the preset motor speed table is provided via auto-calculation based on the user demands, the preset motor speed at one of the plurality of fixed values of the duty cycle of the pulse width modulation signal is calculated according to a difference between a customized motor speed at a first value of the duty cycle and a second value of the duty cycle and a difference between the first value and the second value of the duty cycle, the first value of the duty cycle is less than the one of the plurality of fixed values of the duty cycle, and the second value of the duty cycle is larder than the one of the plurality of fixed values of the duty cycle; and
a motor controller, coupled to the computing device via the input and output interface, the motor controller is configured to provide the pulse width modulation signal to drive a motor based on the preset speed table.

8. The motor control system of claim 7, wherein the user demands comprise:
a minimum value of the duty cycle of the pulse width modulation signal and a first value of the customized motor speed corresponding to the minimum value of the duty cycle of the pulse width modulation signal;
a maximum value of the duty cycle of the pulse width modulation signal and a second value of the customized motor speed corresponding to the maximum value of the duty cycle of the pulse width modulation signal; and
an intermediate value of the duty cycle of the pulse width modulation signal and a third value of the customized motor speed corresponding to the intermediate value of the duty cycle of the pulse width modulation signal, wherein the intermediate value is larger than the minimum value, and is smaller than the maximum value; wherein
the first value of the duty cycle comprises the minimum value or the intermediate value, and the second value of the duty cycle comprises the intermediate value or the maximum value.

9. The motor control system of claim 7, wherein the user demands further comprise:
a minimum value of the duty cycle of the pulse width modulation signal and a first value of the customized motor speed corresponding to the minimum value of the duty cycle of the pulse width modulation signal;
a maximum value of the duty cycle of the pulse width modulation signal and a second value of the customized motor speed corresponding to the maximum value of the duty cycle of the pulse width modulation signal; and a corner value of the duty cycle of the pulse width modulation signal, wherein the customized motor speed equals the first value when the duty cycle of the pulse width modulation signal equals or is less than the corner value.

10. The motor control system of claim 7, wherein:
the computing device is further configured to plot a customized speed curve based on the user demands, wherein the customized speed curve is related with the customized motor speed and the duty cycle of the pulse width modulation signal;
the computing device is further configured to plot a preset speed curve based on the preset speed table, wherein the preset speed curve is related with the preset motor speed and the duty cycle of the pulse width modulation signal; and
the customized speed curve and the preset speed curve are displayed simultaneously through the graphical user interface.

11. The motor control system of claim 7, wherein the user demands further comprise:
a corner value of the duty cycle of the pulse width modulation signal, the corner value is between a minimum value and an intermediate value of the duty cycle of the pulse width modulation signal; and wherein
the preset motor speed maintains a first value when the duty cycle of the pulse width modulation signal equals or is less than the corner value.

12. A control method for controlling a motor, comprising:
receiving user demands through a graphical user interface, wherein the user demands comprise a minimum value of a duty cycle of a pulse width modulation signal and a first value of a customized motor speed corresponding to the minimum value of the duty cycle of the pulse width modulation signal, a maximum value of the duty cycle of the pulse width modulation signal and a second value of the customized motor speed corresponding to the maximum value of the duty cycle of the pulse width modulation signal, and an intermediate value of the duty cycle of the pulse width modulation signal and a third value of the customized motor speed corresponding to the intermediate value of the duty cycle of the pulse width modulation signal, the intermediate value is larger than the minimum value, and is smaller than the maximum value;
providing a preset speed table based on the user demands, wherein the preset speed table comprises the duty cycle of the pulse width modulation signal and a preset motor speed corresponding to the duty cycle of the pulse width modulation signal, and the preset motor speed table is provided via auto-calculation based on the user demands, the preset motor speed at one of the plurality of fixed values of the duty cycle of the pulse width modulation signal is calculated according to a difference between the second value and the third value of the customized motor speed and a difference between the maximum value and the intermediate value of the duty cycle, the intermediate value is less than the one of the plurality of fixed values, and the maximum value is larger than the one of the plurality of fixed values; and
providing the pulse width modulation signal based on the preset speed table for driving the motor.

13. The control method of claim 12, further comprising displaying an actual motor speed and the preset motor speed simultaneously through the graphical user interface.

14. The control method of claim 12, further comprising calculating a difference between the preset motor speed and an actual motor speed, and plotting an error curve through the graphical user interface, wherein the error curve is related with the duty cycle of the pulse width modulation signal and the difference between the preset motor speed and the actual motor speed.

15. The control method of claim 12, wherein the user demands further comprise:
a corner value of the duty cycle of the pulse width modulation signal, the corner value is between the minimum value and the intermediate value of the duty cycle of the pulse width modulation signal; and wherein
the preset motor speed maintains the first value when the duty cycle of the pulse width modulation signal equals or is less than the corner value.

\* \* \* \* \*